(12) United States Patent
Cases et al.

(10) Patent No.: US 8,140,441 B2
(45) Date of Patent: Mar. 20, 2012

(54) WORKFLOW MANAGEMENT IN A GLOBAL SUPPORT ORGANIZATION

(75) Inventors: Moises Cases, Austin, TX (US); Oliver R. Fasterling, Austin, TX (US); Bhyrav M. Mutnury, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 12/254,092

(22) Filed: Oct. 20, 2008

(65) Prior Publication Data

US 2010/0100412 A1 Apr. 22, 2010

(51) Int. Cl.
*G06Q 10/00* (2012.01)
(52) U.S. Cl. .................................................. 705/304
(58) Field of Classification Search ..................... None
See application file for complete search history.

(56) References Cited

U.S. PATENT DOCUMENTS

| | | | | |
|---|---|---|---|---|
| 5,107,500 | A * | 4/1992 | Wakamoto et al. | 714/26 |
| 5,678,002 | A | 10/1997 | Fawcett et al. | |
| 6,389,400 | B1 * | 5/2002 | Bushey et al. | 705/7.14 |
| 6,542,897 | B2 * | 4/2003 | Lee | 1/1 |
| 6,615,240 | B1 * | 9/2003 | Sullivan et al. | 709/205 |
| 6,665,395 | B1 * | 12/2003 | Busey et al. | 379/265.09 |
| 6,973,620 | B2 * | 12/2005 | Gusler et al. | 715/708 |
| 7,349,534 | B2 * | 3/2008 | Joseph et al. | 379/265.01 |
| 2002/0123983 | A1 * | 9/2002 | Riley et al. | 707/1 |
| 2007/0041562 | A1 * | 2/2007 | Bernier | 379/265.01 |

OTHER PUBLICATIONS

"BMC Software—Activate Business with the Power of ITÂ?", http://www.bmc.com/ obtained Jul. 18, 2008.
"HEAT Help Desk Software—Based on IT Best Practices for IT Support Centers", http://www.smasystems.com/products/heat.htm obtained Jul. 18, 2008.
"Help Desk Software and Resources", http://www.helpdesks.com/ obtained Jul. 18, 2008.
"HP OpenView solution and product guide", 2006.
"IBM Tivoli Service Request Manager", http://www.ibm.com/common/ssi/fcgi-bin/ssialias?infotype=pm&subtype=sp&appname=SWGE_TI_TI_USEN&htmlfid=TID10270USEN&attachment=TID10270USEN.PDF obtained Jul. 18, 2008.
"Intranet software, workflow software and document management—Smart Media", http://www.smartmedia.com/ obtained Jul. 18, 2008.
"IT Management software and solutions from CA", http://ca.com/us/ obtained Jul. 18, 2008.

* cited by examiner

*Primary Examiner* — Gerardo Araque, Jr.
(74) *Attorney, Agent, or Firm* — DeLizio Gilliam, PLLC (57) ABSTRACT

Customer support involves multiple levels of support, where customer support personnel at higher levels have more experience and a higher cost associated with their services. A random assignment of support personnel to a problem, at lower levels, can lead to multiple call transfers, a customer being put "on hold", ineffective resource utilization, and high service costs being billed to customers. Functionality can be implemented to assign a support person to resolve the customer's problem based on a multi-dimensional dynamic social network database of resources (e.g., personnel experience, success rate, skill set, social network, etc.) which allows for efficient assignment of support personnel to a problem. Routing a customer call to the most appropriate support person at a given level before determining support personnel at higher levels can ensure optimization in terms of return on investment and resource utilization. Optimally selecting and assigning support personnel can also ensure customer satisfaction.

25 Claims, 5 Drawing Sheets

WORKFLOW MANAGEMENT IN A GLOBAL SUPPORT ORGANIZATION

BACKGROUND

Embodiments of the inventive subject matter generally relate to the field of resource management, and more particularly, to techniques for workflow management in a global support organization.

In typical medium to large-scale service business organizations, customer support involves multiple levels of support. Support personnel at higher levels have more experience, a larger skill set, and a higher cost associated with their services. Random assignment of higher level support personnel to a problem can lead to multiple call transfers, the customer being put "on hold", ineffective resource utilization, and high service costs being billed to customers.

SUMMARY

Embodiments include a method that determines a problem ticket for a customer. The problem ticket indicates a problem and information about the customer. One or more customer support personnel databases is searched based on the problem, a first customer support level, and the information about the customer. A first customer support person of the first customer support level is determined and the problem is routed to the first support person. The one or more customer support personnel databases is searched based on the problem, a second customer support level, and the information about the customer. A second support person of the second support level is determined. The second customer support level corresponds to a greater amount of one or more of skills, knowledge, and experience. The problem ticket is routed to the second support person when the first support person fails to resolve the problem.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, well-known instruction instances, protocols, structures, and techniques have not been shown in detail in order not to obfuscate the description.

Services (e.g., development, maintenance, repair, support, etc.) in business organizations are typically organized in hierarchical levels. Each hierarchical level has specific roles, tasks, and responsibilities within its control. In addition, requests to each of the hierarchical levels are staggered over time with their own specific schedules. These tasks, requests, and responsibilities should be handled in a productive and effective way to maximize the value of each level and to improve a customer's satisfaction. Customer support in typical service business organizations may involve three or more levels of support. Instead of randomly assigning support personnel, intelligently assigning support personnel to resolve a customer's problem based on factors such as the support personnel's skill, success rate, and experience allows for efficient assignment of support personnel to a problem. Routing a customer call to the most experienced support person at a given level before determining support personnel at higher levels can ensure optimization in terms of return on investment and resource utilization. Intelligently assigning support personnel can include taking into account different aspects of a dynamic database of resources (e.g., personnel experience, success rate, skill set, location, etc). This can result in the least number of call transfers, minimum time that the customer is "on hold", effective time and resource utilization, and also lower service costs being billed to customers.

Figure 1:
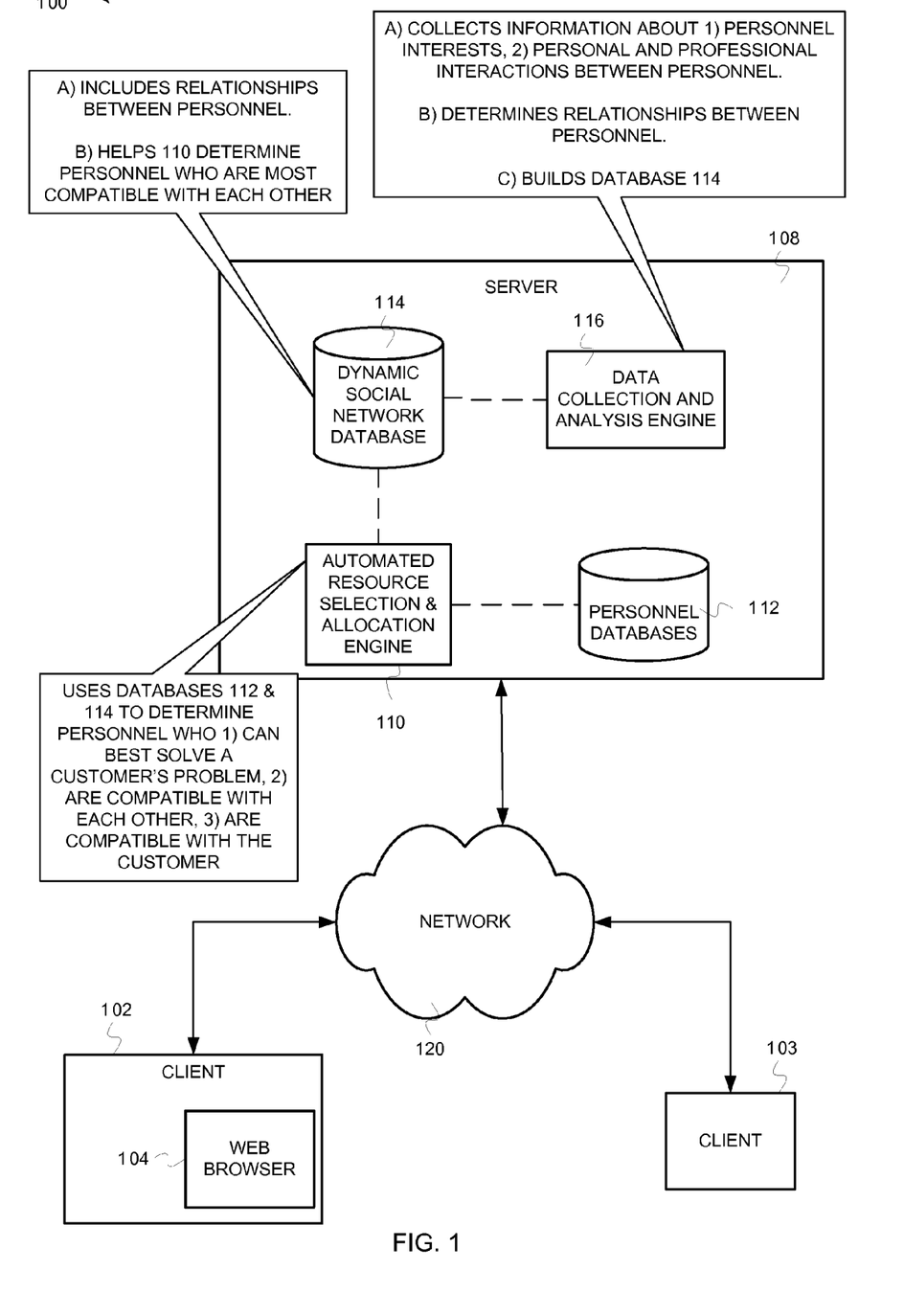
FIG. 1 is an example block diagram illustrating a computer system configured to optimally select customer support personnel within an organization.
Figure 2:
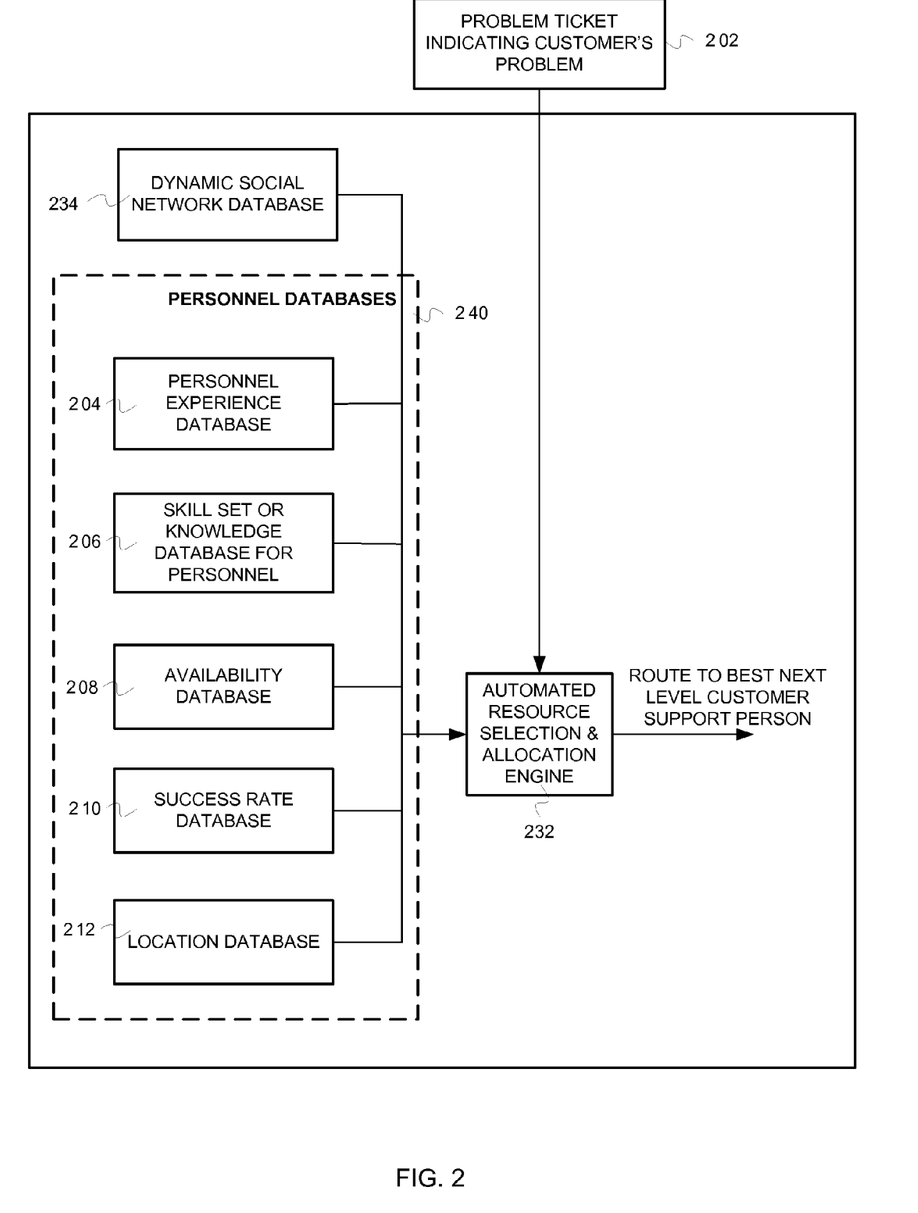
FIG. 2 is an example block diagram illustrating databases used to optimally select support personnel to resolve customer problems.

FIG. 1 is an example block diagram illustrating a client-server system configured to optimally select customer support personnel within an organization. As shown in FIG. 1, the system 100 includes a server 108 and clients 102 and 103. The server 108 includes an automated resource selection and allocation engine 110 coupled with personnel databases 112 (comprising one or more databases as shown in FIG. 2) and a dynamic social network database 114. The dynamic social network database 114 is also coupled with a data collection and analysis engine 116.

In some embodiments, the automated resource selection and allocation engine 110 receives a ticket indicating a customer's problem, initial troubleshooting steps, and other relevant information. The automated resource selection and allocation engine 110 interfaces with the personnel databases 112 and uses a suitable optimization algorithm (e.g., weight function optimization techniques, Swarm Intelligence (SI) based optimization algorithms, etc.) to determine a level 1 customer support person who is best suited (in terms of experience, success rate, knowledge, etc.) to resolve a customer's problem. Level 1 support personnel are typically at the lowest level in a customer support hierarchy, with the least number of skills and the lowest cost associated with their services. If the determined level 1 support person is unable to resolve the problem, the automated resource selection and allocation engine 110 determines whether there are other level 1 support personnel with specific expertise or who have encountered a similar type of problem. If the automated resource selection and allocation engine 110 determines that none of the level 1 support personnel can resolve the problem, it determines one—or more—higher level support personnel who are best suited to solve the problem. To determine the higher level support personnel, who are compatible with the customer's interests (e.g., share a common language with the customer), the automated resource selection and allocation engine 110 interfaces with the dynamic social network database 114.

The data collection and analysis engine 116 interfaces with different applications (e.g., online social networking sites) and databases (e.g., an organization's personnel database, an organization's project database, etc.) and determines a support person's interests and relevant background. For example, the data collection and analysis engine 116 can analyze the organization's databases and determine a number of projects on which two or more of the support personnel have worked together. The data collection and analysis engine 116 can also determine inter-personnel interaction, and score each interaction based on a scoring mechanism. For example, the data collection and analysis engine 116 can keep track of number of emails sent by personnel, number of chat conversations initiated, etc. to determine one or more other personnel with whom a support person might share a good work relationship. Other examples of data collected by the data collection and analysis engine 116 include a support person's colleagues, number of projects that a support person has worked on with the colleagues, a support person's officemates, etc. The data collection and analysis engine 116 may also allow personnel to enter information about themselves and about other personnel via a web browser 104. The data collection and analysis engine 116 may also ask personnel to complete a survey indicating, for example, the number of times they go out to lunch with colleagues, cultural background, hobbies, interests, languages known, etc. The data collection and analysis engine 116 compiles the personnel information and stores this information in the dynamic social network database 114. The data collection and analysis engine 116 also dynamically updates the dynamic social network database 114 based on personnel interactions, customers, relations between the customers and support personnel, customer problem resolution, etc.

The data collection and analysis engine 116 can score relationships between personnel based on the number of emails exchanged, the number of chat conversations initiated, etc. The personnel relationship score can represent strength of the relationship between personnel, wherein the strength of the relationship determines the effectiveness of communication and compatibility between the personnel.

The server 108 and clients 102 and 103 are connected through a communication network 120. The communication network 120 can include any technology suitable for passing communication between the clients and server (e.g., Ethernet, 802.11n, SONET, etc.). Moreover, the communication network 120 can be part of other networks, such as cellular telephone networks, public-switched telephone networks, cable television networks, etc. In some embodiments, the server 108 and clients 102 and 103 can be any suitable computing devices capable of executing software in accordance with the embodiments described herein.

FIG. 2 is an example block diagram illustrating databases used to optimally select support personnel to resolve customer problems. In FIG. 2, the personnel databases 240 comprise a personnel experience database 204, a skill-set or knowledge database for personnel 206, an availability database 208, a personnel success rate database 210, and a location database 212. The personnel databases 240 and a dynamic social network database 234 are coupled with an automated resource selection and allocation engine 232.

The personnel experience database 204 includes the number of years personnel have worked in an organization and the number of times the personnel have solved or attempted to solve a particular type of problem. The knowledge database 206 includes a list of categories (e.g., servers, operating systems, etc.) in which the personnel are proficient (or has achieved certification). The availability database 208 indicates whether the personnel are available, on vacation, when they are expected to come back to work, and also whether the personnel are busy attending to another problem. The success rate database 210 indicates the number of times personnel have successfully helped resolve a problem, while the location database 212 indicates the personnel's location. The location database 212 can be used to locate one or more of the personnel (e.g., a support engineer), closest to the customer, to provide prompt onsite customer support.

The automated resource selection and allocation engine 232 receives a customer's problem ticket 202 and determines a category associated with the problem. The customer's problem ticket can be a file including information about the customer's problem, steps already taken in an attempt to resolve the problem, previous customer service representatives, position in a queue, etc. The automated resource selection and allocation engine 232 can use any suitable optimization algorithm (e.g., weight function optimization techniques, Swarm Intelligence based optimization, etc.) and determine support personnel taking into account, their skills, availability, skill level, problem ticket information, etc. The automated resource selection and allocation engine 232 can determine the best available support person from the available support personnel (depending on information in the incoming request, the personnel databases, the social networking databases, etc.) for minimal cost to the organization and to the customer. As the organization handles work, the organizational structure (e.g., content of the databases, personnel changes, etc.) may change dynamically to accurately represent the skills and experience of the organization (e.g., interactions between personnel, interactions between a support person and a customer, work groups, etc.), enabling the automated resource selection and allocation engine 232 to make an intelligent decision.

The block diagram depicted in FIG. 2 is exemplary and should not be used to limit the embodiments. For example, although FIG. 2 depicts the personnel databases 240 as comprising five databases, the personnel databases 240 can include any number of additional databases (e.g., language database) with relevant personnel information enabling the automated resource selection and allocation engine 232 to make the best choice based on the information in a customer's problem ticket. Personnel information may be grouped into different sets of personnel databases depending on the organizational level. For example, level 1 personnel information may be stored in personnel database 1 and level N personnel information may be stored in personnel database N.

Figure 3:
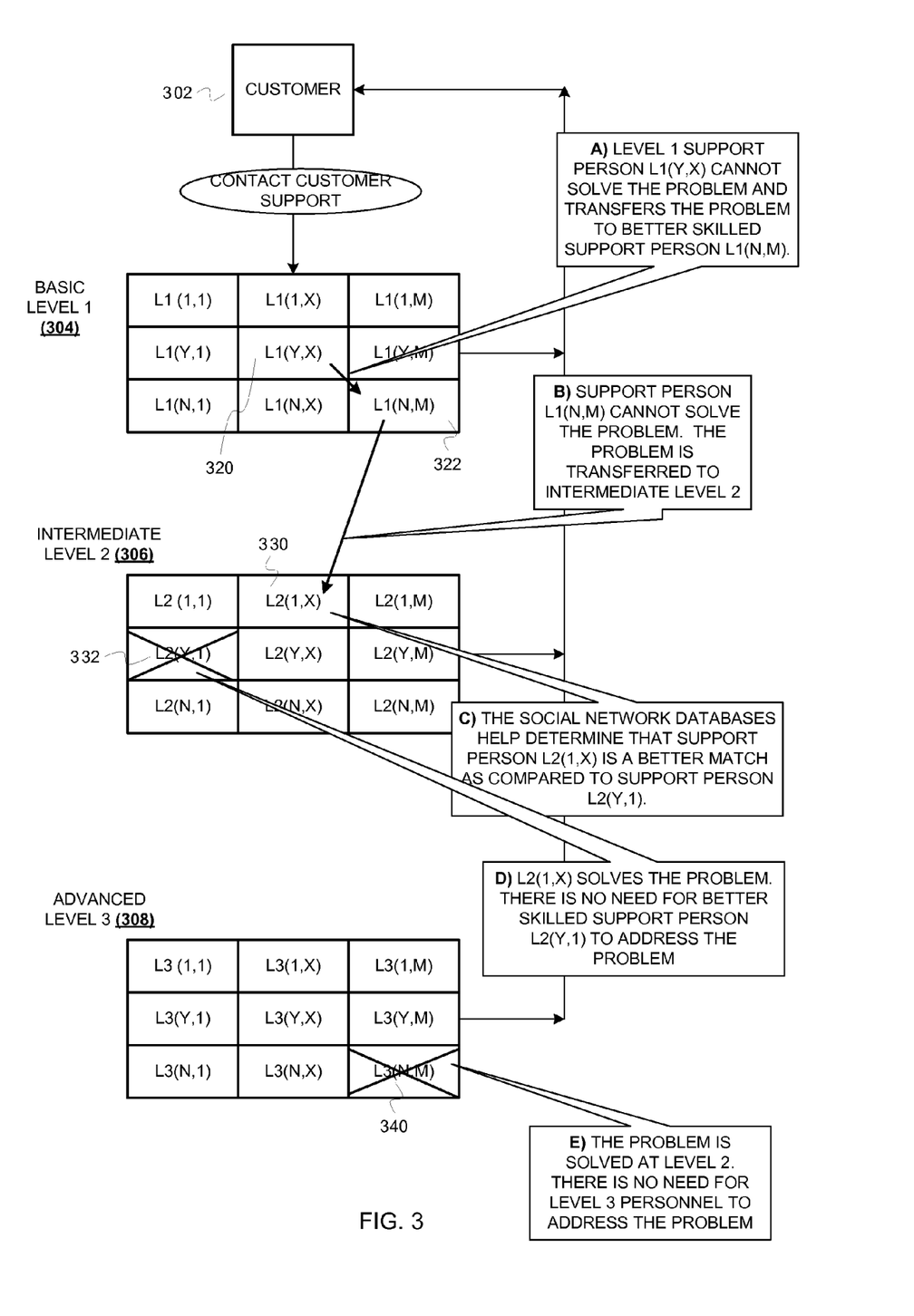
FIG. 3 is an example conceptual diagram illustrating routing of a customer ticket to one or more customer support personnel.

FIG. 3 is an example conceptual diagram illustrating routing of a customer ticket to one or more customer support personnel. As shown in FIG. 3, an organization comprises three customer support levels—basic level 1 (304), intermediate level 2 (306), and advanced level 3 (308). Each of these levels comprises M×N personnel, wherein the personnel are represented by nodes. Support personnel at higher levels typically have more experience and more skills. Also, the cost associated with having higher level support personnel resolve a customer's problem may be higher, as compared to the cost associated with having lower level personnel resolve the problem. In FIG. 3, a customer 302 contacts the organization's customer support (via telephone, email, instant message, etc.) and identifies his/her problem. The call is first routed to node L1(Y, X) (node 320). L1(Y,X) (320) is a level 1 (lowest level) support person with basic experience in solving problems similar to the customer's problem. The most experienced support person at the basic level, L1(N, M) (node 322), may be busy resolving another customer's issues. At stage A, support person L1(Y, X) 320 is unable to solve the customer's problem and transfers the problem to the more experienced customer support person, L1 (N, M) 322. The automated resource selection and allocation engine 110 first ensures that the experienced level 1 personnel have received and tried to solve the problem. The automated resource selection and allocation engine 110 then transfers the problem to the next level only after none of the level 1 personnel are able to solve the problem. In some instances, the automated resource selection and allocation engine 110 may determine one or more other level 1 personnel best suited (e.g., in terms of experience, skill set, problem solving record), to resolve the customer's problem. The automated resource selection and allocation engine 110 can route the customer's problem to the next level if none of the determined experienced level 1 personnel are able to resolve the problem. This can ensure optimal use of resources and conservation of time and money.

At stage B, support person L1 (N, M) 322 cannot solve the customer's problem and transfers the problem to the next level (intermediate level 2 (306)). A problem routed to a higher level may not be a simple problem and may require support personnel to make an onsite assessment of the problem. At level 2, support person L2(Y, 1) 332 is the most experienced person (as determined using the personnel databases 112). Another support person L2 (1, X) 330 may have less experience as compared to L2(Y, 2) 332. At stage C, the automated resource selection and allocation engine 110 chooses the slightly less experienced person L2 (1, X) over support person L2(Y, 1) based on information in the dynamic social network database 114. For example, solving the customer's problem may require level 1 and level 2 support personnel to work together, and the dynamic social network database may indicate that support personnel L2(1,X) 330 and L1(N,M) 322 have collaborated on various projects in the past and share a good rapport. The dynamic social network database 114 may also indicate that support person L2 (1, X) 330 shares a common language and common cultural background with the customer. Therefore, the automated resource selection and allocation engine may route the problem to support person L2 (1, X).

At stages D and E, support person L2 (1, X) 330 resolves the problem, thus precluding the need for transferring the problem to the more experienced level 2 support person (L2 (Y,1) 332) and advanced level 3 personnel. This is indicated by crossed out nodes L2(Y,1) 332 and L3 (N,M) 340.

Figure 4:
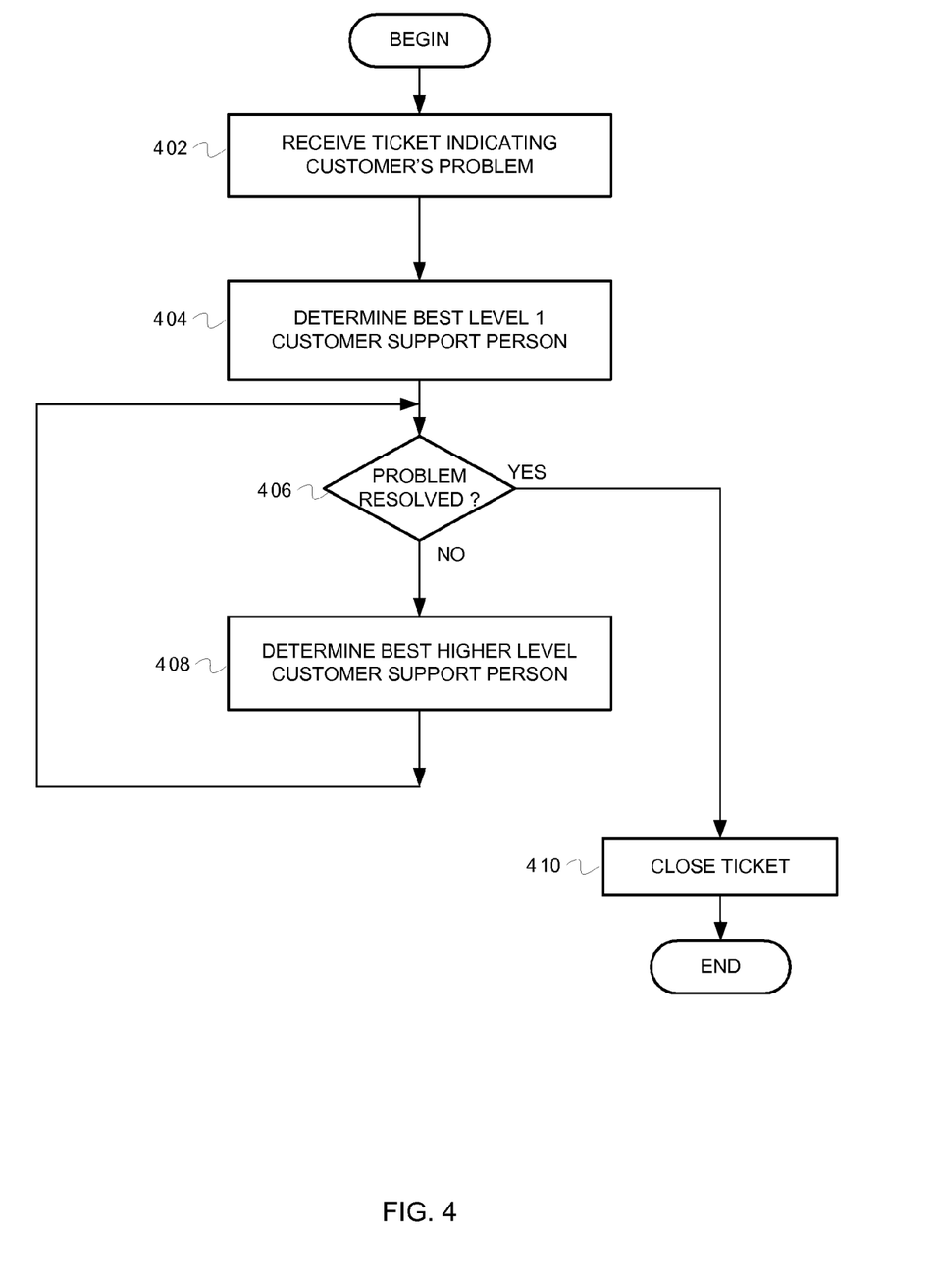
FIG. 4 is a flow diagram illustrating example operations for determining optimally determining customer support personnel.

FIG. 4 is a flow diagram illustrating example operations for determining optimal resources for customer support. The following discussion will describe the flow 400 with reference to the system of FIG. 1. The flow diagram 400 begins at block 402.

At block 402, an automated resource selection and allocation engine 110 receives a customer's problem ticket indicating a customer's problem. The problem ticket can include a number indicating the customer's position in a queue, a file indicating the customer's problem, and steps (from a previous support person) that have been taken to resolve the problem. In some instances, the automated resource selection and allocation engine 110 may receive a ticket from an independent queuing and ticket-generating engine (not shown), while in other instances, the automated resource selection and allocation engine 110 may include functionality to generate the ticket and store it in a queue (based on time of arrival, priority, etc). The flow continues at block 404.

At block 404, the automated resource selection and allocation engine 110 determines a level 1 support person best suited to address the customer's problem. Typically, level 1 support personnel have basic technical knowledge, a little experience in resolving customer issues, and a lower cost associated with their services. The automated resource selection and analysis engine 110 can use the customer's problem ticket to determine a category to which the customer's problem belongs. The automated resource selection and allocation engine 110 can interface with personnel databases 112 and determine the available support person with the most experience in resolving a particular type of problem. For example, the automated resource selection and allocation engine 110 may determine that the customer's problem falls within the "operating systems" category and use the personnel databases 112 to locate a support person who is adept at solving problems related to operating systems.

The automated resource selection and allocation engine 110 may use a simple weighted combination of the information from one or more of the personnel databases 112 to find the best available a customer support person to route the problem. For example, a resource (i.e., customer support person) may be represented by a weighted combination as shown below, $$\text{resource}=(a*\text{Experience}+b*\text{Skill set}+c*\text{Success rate}+ \ldots +z*\text{other factors})$$

The database values (e.g., experience, skill set, success rate, etc.) may be dependent on the capability of customer support personnel. For example, a support person with a 100% problem resolving success rate may have a high "success rate" value as compared to a support person with a 50% success rate. The weights (a, b, c ... z) may be dependent on the importance attached to each of the databases. In some implementations, the automated resource selection and allocation engine 110 may assign each weight an equal value (e.g., a=b=c= ... z=1). In other implementations, the automated resource selection and allocation engine 110 may assign a different weight to each of the databases. For example, the automated resource selection and allocation engine 110 may determine that a support person's experience should be given more importance as compared to the support person's location. Therefore, the automated resource selection and allocation engine 110 may assign a high weight to the experience database and a lower weight to the location database. The automated resource selection and allocation engine 110 can determine and select the best resource by determining the resource with the maximum value, $$\text{best resource}=\text{Maximize (resource)}.$$

The automated resource selection and allocation engine 110 routes the customer's problem ticket to the determined best resource (i.e., best customer support person). As another example, resource selection may sometimes be represented as an optimization problem with multi-dimensional attributes and the weights may have different importance. In this example, the automated resource selection and allocation engine 110 can use a more complex optimization algorithm based on Swarm Intelligence, to determine the best available customer support person to resolve the customer's problem. Using a variety of iterative processes, the Swarm Intelligence algorithms can be used to determine the best customer support person to resolve the customer's problem. The flow continues at block 406.

At block 406, the automated resource selection and allocation engine 110 determines whether the customer's problem has been resolved. In some instances, the automated resource selection and allocation engine 110 may prompt the customer to click on a button to indicate whether his/her problem was solved (e.g., press zero if the problem was solved and one of the problem was not solved). In some instances, customer support personnel may indicate their inability to resolve the customer's problem and request that the problem be routed to other, more experienced personnel. If the automated resource selection and allocation engine 110 determines that the customer's problem has been resolved, the flow continues at block 410. Otherwise, the flow continues at block 408.

At block 408, the automated resource selection and allocation engine 110 determines one or more high-level support personnel best suited to resolve the customer's problem. After the automated resource selection and allocation engine 110 determines that the level 1 (lowest level) support person cannot solve the customer's problem, it determines one or more high-level support personnel. If level 1 support personnel cannot solve the problem via phone or online help, an organization may send one or more higher level support personnel to assess and resolve the problem onsite. The one or more higher level support personnel can be determined using personnel databases 112 as described earlier. However, to improve customer satisfaction, the automated resource selection and allocation engine 110 can also access a dynamic social network database 114 and determine support personnel with whom the customer may feel most comfortable interacting (e.g., based on a common language, country of origin, interests, etc). The dynamic social network database 114 also enables the automated resource selection and allocation engine 110 to choose two or more support personnel who have worked together in the past and share a good rapport, to improve work efficiency. The flow continues at block 406, where the automated resource selection and allocation engine 110 determines whether the selected higher-level support personnel were able to resolve the problem. The automated resource selection and allocation engine 110 continues to determine one or more support personnel from the same or higher customer support levels until the customer's problem is resolved.

At block 410, the automated resource selection and allocation engine 110 closes the customer's ticket. In some instances, the automated resource selection and allocation engine 110 may perceive the customer hanging up (or logging off) as a sign of a completed request and may remove the customer's request from the queue. In some embodiments, the automated resource selection and allocation engine 110 may also enable customer support personnel to indicate additional information (e.g., user's preferred language, specific nature of the problem, method used to solve the problem, etc.) to add to data in the databases and improve problem solving efficiency. From block 410, the flow ends.

Figure 5:
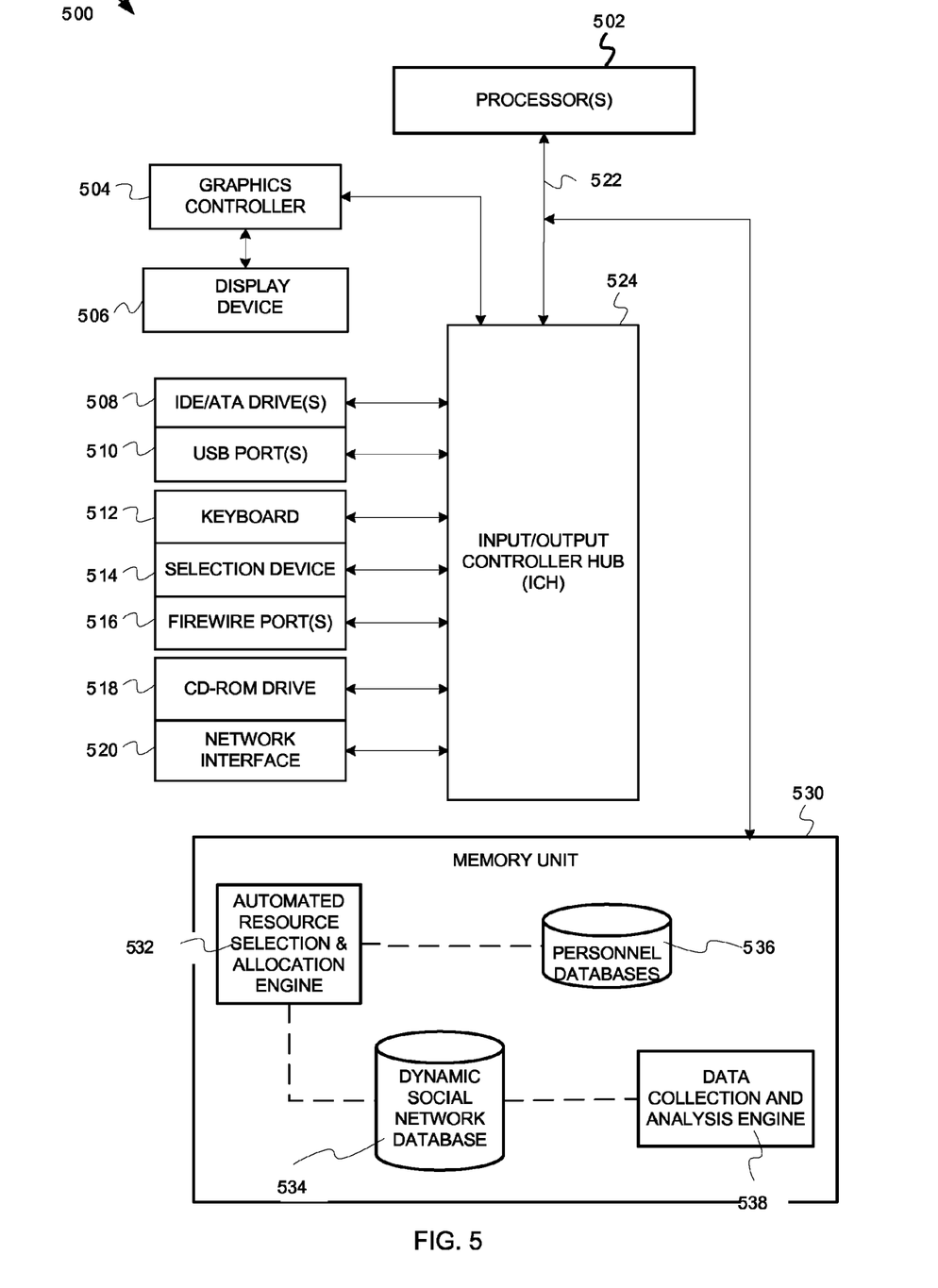
FIG. 5 is an example block diagram illustrating a client-server system configured to optimally select customer support personnel within an organization.

FIG. 5 is an example block diagram illustrating a computer system configured to optimally select resources, for customer support, within an organization. The computer system 500 includes a processor 502. The processor 502 is connected to an input/output controller hub 524 (ICH), also known as a south bridge, via a bus 522 (e.g., PCI, ISA, PCI-Express, HyperTransport, etc). A memory unit 530 interfaces with the processor 502 and the ICH 524. The main memory unit 530 can include any suitable random access memory (RAM), such as static RAM, dynamic RAM, synchronous dynamic RAM, extended data output RAM, etc. The ICH 524 connects and controls peripheral devices. In FIG. 5, the ICH 524 is connected to IDE/ATA drives 508, universal serial bus (USB) ports 510, a keyboard 512, a selection device 514, firewire ports 516, CD-ROM drive 518, and a network interface 520. The ICH 524 can also be connected to a graphics controller 504. The graphics controller is connected to a display device 506 (e.g., monitor).

The memory unit 530 comprises an automated resource selection and allocation engine 532 coupled with a dynamic social network database 534 and personnel databases 536. The dynamic social network database 534 is also coupled with a data collection and analysis engine 538. The personnel databases 536 (described in FIG. 2) comprise personnel information such as a support person's success rate at solving problems, knowledge base, culture and language, etc. The data collection and analysis engine 538 collects and analyzes social network data, determines personal and professional interactions between personnel (e.g., personnel who share the same office may be friends, personnel who have worked with each other on multiple projects may be familiar with each other's style of work, etc.), and stores this data in the dynamic social network database 534. The data collection and analysis engine 538 also dynamically updates the dynamic social network database 534 based on personnel interactions, customers, relations between the customers and support personnel, customer problem resolution, etc. The automated resource selection and allocation engine 532 interfaces with the personnel databases 536 and the dynamic social network database 534 to determine one or more support personnel who are best suited to resolve a customer's problem.

It should be noted that FIG. 5 is exemplary and should not be used to limit the scope of embodiments. In some instances, the functionality for collecting and analyzing social network data may be incorporated within the automated resource selection and allocation engine 532. Also, in some embodiments, the computer system 500 can include additional devices and/or more than one of each component shown in FIG. 5 (e.g., video cards, audio cards, peripheral devices, etc.). For example, in some instances, the computer system 500 may include multiple processors, multiple cores, multiple external CPU's. In other instances, components may even be integrated or subdivided.

Embodiments may take the form of an entirely hardware embodiment, a software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium" or transmitting "machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium that can include an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

CONCLUSION

While the embodiments are described with reference to various implementations and exploitations, it will be understood that these embodiments are illustrative and that the scope of the inventive subject matter is not limited to them. In general, techniques for workflow management in a global support organization are described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, using an electronic device, a problem ticket for a customer, wherein the problem ticket indicates a problem and information about the customer;
    searching, using the electronic device, a set of one or more customer support personnel databases based, at least in part, on the problem, a first customer support level, and the information about the customer, wherein said searching yields a first support person of the first customer support level;
    routing, using the electronic device, the problem ticket to the first support person;
    determining, using the electronic device, that the first support person of the first customer support level cannot resolve the customer problem;
    determining that the first support person should work in conjunction with one of a plurality of personnel of a second customer support level to resolve the problem;
    determining, based on accessing a dynamic social network database via the electronic device, information associated with the first support person and the plurality of personnel of the second customer support level;
    determining a relationship score that indicates a strength of a relationship between the first support person and each of the plurality of personnel of the second customer support level;
    determining that the relationship score between the first support person and a first of the plurality of personnel of the second customer support level is the highest relationship score; and
    prompting the first support person to work in conjunction with the first of the plurality of personnel of the second customer support level to resolve the customer problem.

2. The method of claim 1, wherein said searching the set of one or more customer support personnel databases based, at least in part, on the problem, the first customer support level, and the information about the customer further comprises also searching the dynamic social network database based, at least in part, on the problem and the information about the customer.

3. The method of claim 2, wherein said searching the dynamic social network database is also based on information about the first support person.

4. The method of claim 1 further comprising searching the set of one or more databases and the dynamic social network database based, at least in part on the problem, the first customer support level, and the information about the customer when the first support person fails to resolve the problem, wherein said searching yields a second support person of the first customer support level.

5. The method of claim 1, wherein the customer support personnel databases comprise any one or more of a personnel experience database, a personnel knowledge and skill set database, a personnel location database, a personnel success rate database, and a personnel availability database.

6. The method of claim 1, wherein information in the dynamic social network database comprises personnel language of the first support person and the plurality of personnel of the second customer support level, interests of the first support person and the plurality of personnel of the second customer support level, one or more collaborating colleagues of the first support person and the plurality of personnel of the second customer support level, number of chat conversations initiated by the first support person and the plurality of personnel of the second customer support level, and number of emails exchanged by the first support person and the plurality of personnel of the second customer support level.

7. A method comprising:
    determining, using an electronic device, a problem ticket for a customer, wherein the problem ticket indicates a problem and information about the customer;
    searching, the electronic device, a set of one or more customer support personnel databases based, at least in part, on the problem, a first customer support level, and the information about the customer, wherein said searching yields a plurality of support persons of the first customer support level;
    searching, the electronic device, a dynamic social network database that comprises interests of the plurality of support persons of the first customer support level and the customer based, at least in part on the information about the customer, the problem, and indications of the plurality of support persons of the first customer support level, wherein said searching yields a first of the plurality of support persons that has common interests with the customer; and
    routing, using the electronic device, the problem ticket to the first of the plurality of support persons.

8. The method of claim 7, further comprising:
    determining that the first of the plurality of support persons resolved the problem; and
    updating both the dynamic social network database and at least one of the set of customer support personnel databases to reflect the first of the plurality of support persons resolving the problem.

9. The method of claim 8, wherein:
the determining, using the electronic device, the problem ticket for the customer further comprises one or more of detecting that the customer has initiated a phone call and detecting that the customer is logged into a chat window; and
the determining that the first of the plurality of support persons resolved the problem comprises one or more of detecting that the customer has disconnected the phone call and detecting that the customer has logged off the chat window.

10. The method of claim 7, wherein the first of the plurality of support persons shares, with the customer, any one of a common language, common cultural background, common interests, and common location.

11. One or more machine-readable storage media having stored therein a program product, which when executed a set of one or more processors causes the set of one or more processors to perform operations that comprise:
determining a problem ticket for a customer, wherein the problem ticket indicates a problem and information about the customer;
searching a set of one or more customer support personnel databases based, at least in part, on the problem, a first customer support level, and the information about the customer, wherein said searching yields a first support person of the first customer support level;
routing the problem ticket to the first support person;
determining that the first support person of the first customer support level cannot resolve the customer problem;
determining that the first support person should work in conjunction with one of a plurality of personnel of a second customer support level to resolve the problem, determining, based on accessing a dynamic social network database, information associated with the first support person and the plurality of personnel of the second customer support level;
determining a relationship score that indicates a strength of a relationship between the first support person and each of the plurality of personnel of the second customer support level;
determining that the relationship score between the first support person and a first of the plurality of personnel of the second customer support level is the highest relationship score; and
prompting the first support person to work in conjunction with the first of the plurality of personnel of the second customer support level to resolve the customer problem.

12. The machine-readable storage media of claim 11, wherein said operation of searching the set of one or more customer support personnel databases based, at least in part, on the problem, the first customer support level, and the information about the customer further comprises searching the dynamic social network database based, at least in part, on the problem and the information about the customer.

13. The machine-readable storage media of claim 12, wherein said operation of searching the dynamic social network database is also based on information about the first support person.

14. The machine-readable storage media of claim 11, wherein the operations further comprise searching the set of one or more databases and the dynamic social network database based, at least in part on the problem, the first customer support level, and the information about the customer when the first support person fails to resolve the problem, wherein said searching yields a second support person of the first customer support level.

15. The machine-readable storage media of claim 11, wherein the customer support personnel databases comprise any one or more of a personnel experience database, a personnel knowledge and skill set database, a personnel location database, a personnel success rate database, and a personnel availability database.

16. The machine-readable storage media of claim 11, wherein information in the dynamic social network database comprises personnel language of the first support person and the plurality of personnel of the second customer support level, interests of the first support person and the plurality of personnel of the second customer support level, one or more collaborating colleagues of the first support person and the plurality of personnel of the second customer support level, number of chat conversations initiated by the first support person and the plurality of personnel of the second customer support level, and number of emails exchanged by the first support person and the plurality of personnel of the second customer support level.

17. One or more machine-readable storage media, wherein the operations comprise:
determining a problem ticket for a customer, wherein the problem ticket indicates a problem and information about the customer;
searching a set of one or more customer support personnel databases based, at least in part, on the problem, a first customer support level, and the information about the customer, wherein said searching yields a plurality of support persons of the first customer support level;
searching a dynamic social network database that comprises interests of the plurality of support persons of the first customer support level and the customer based, at least in part on the information about the customer, the problem, and indications of the plurality of support persons of the first customer support level, wherein said searching yields a first of the plurality of support persons that has common interests with the customer; and
routing the problem ticket to the first of the plurality of support persons.

18. The machine-readable storage media of claim 17, wherein the operations also comprise:
determining that the first of the plurality of support persons resolved the problem; and
updating both the dynamic social network database and at least one of the set of customer support personnel databases to reflect the first of the plurality of support persons resolving the problem.

19. The machine-readable storage media of claim 18, wherein:
said operation of determining the problem ticket for the customer using the electronic device further comprises one or more of detecting that the customer has initiated a phone call and detecting that the customer is logged into a chat window; and
said operation of determining that the first of the plurality of support persons resolved the problem comprises one or more of detecting that the customer has disconnected the phone call and detecting that the customer has logged off the chat window.

20. The machine-readable storage media of claim 17, wherein the first of the plurality of support persons shares, with the customer, any one of a common language, common cultural background, common interests, and common location.

21. An apparatus comprising:
a set of one or more processors;
a memory unit coupled with the set of one or more processors; and
an automated resource selection and allocation engine operable to:
  determine a problem ticket for a customer, wherein the problem ticket indicates a problem and information about the customer;
  search a set of one or more customer support personnel databases based, at least in part, on the problem, a first customer support level, and the information about the customer, wherein the search yields a first support person of the first customer support level;
  route the problem ticket to the first support person;
  determine that the first support person should work in conjunction with one of a plurality of personnel of a second customer support level to resolve the problem, in response to the automated resource selection and allocation engine determining that the first support person of the first customer support level cannot resolve the customer problem;
  determine, based on accessing a dynamic social network database, information associated with the first support person and the plurality of personnel of the second customer support level;
  determine a relationship score that indicates a strength of a relationship between the first support person and each of the plurality of personnel of the second customer support level;
  determine that the relationship score between the first support person and a first of the plurality of personnel of the second customer support level is the highest relationship score; and
  prompt the first support person to work in conjunction with the first of the plurality of personnel of the second customer support level to resolve the customer problem.

22. The apparatus of claim 21, wherein the automated resource selection and allocation unit being operable to search the set of one or more customer support personnel databases based, at least in part, on the problem, the first customer support level, and the information about the customer further comprises the automated resource selection and allocation engine being operable to search the dynamic social network database based, at least in part, on the problem and the information about the customer.

23. The apparatus of claim 21, further comprises the automated resource selection and allocation engine being operable to search the set of one or more databases and the dynamic social network database based, at least in part on the problem, the first customer support level, and the information about the customer when the first support person fails to resolve the problem, wherein the search yields a second support person of the first customer support level.

24. The apparatus of claim 21, further comprising:
a data collection and analysis engine operable to dynamically update a dynamic social network database based on any one or more of interactions between support personnel, the customers, interactions between the customers and the support personnel, and problem resolution.

25. The apparatus of claim 21, wherein the automated resource selection and allocation engine comprises one or more machine-readable media.

* * * * *